(12) United States Patent
Lau

(10) Patent No.: US 8,251,523 B2
(45) Date of Patent: Aug. 28, 2012

(54) COMPUTER SYSTEM WITH PROJECTOR

(75) Inventor: Choon-Tyng Lau, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 328 days.

(21) Appl. No.: 12/689,093

(22) Filed: Jan. 18, 2010

(65) Prior Publication Data

US 2011/0085093 A1   Apr. 14, 2011

(30) Foreign Application Priority Data

Oct. 9, 2009 (CN) .......................... 2009 1 0308140

(51) Int. Cl.
*G03B 21/22* (2006.01)
(52) U.S. Cl. .......................... 353/119; 348/789

(58) Field of Classification Search .................. 353/119; 361/679.1; 348/789; 248/122.1
See application file for complete search history.

(56) References Cited

U.S. PATENT DOCUMENTS 8,081,437 B2 * 12/2011 Leng .......................... 361/679.23
2010/0060866 A1 * 3/2010 Chang et al. ..................... 353/98

* cited by examiner

*Primary Examiner* — Que T Le
*Assistant Examiner* — Jerry Brooks
(74) *Attorney, Agent, or Firm* — Altis Law Group, Inc.

(57) ABSTRACT

A computer system includes a host, a bracket and a projector. The host includes a holding portion, and the holding portion defines a first space. The bracket is secured to the host and defines a second space. The projector is electrically connected to the host, and rotatable relative to the first space and the second space.

20 Claims, 4 Drawing Sheets

COMPUTER SYSTEM WITH PROJECTOR

BACKGROUND

1. Technical Field

The present disclosure relates to a computer system with a projector.

2. Description of Related Art

A projector is usually used for conference room presentations. Normally, a data cable should be disengaged from a computer display, and is then coupled to the projector. Then the data cable is reconnected to the computer after use. This is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, reference numerals designate corresponding parts throughout several views.

DETAILED DESCRIPTION

The disclosure is illustrated by way of example and not by way of limitations in the figures of the accompanying drawings in which like references indicate similar elements. It should be noted that references to "an" or "one" embodiment in this disclosure are not necessarily to the same embodiment, and such references mean at least one.

Figure 1:
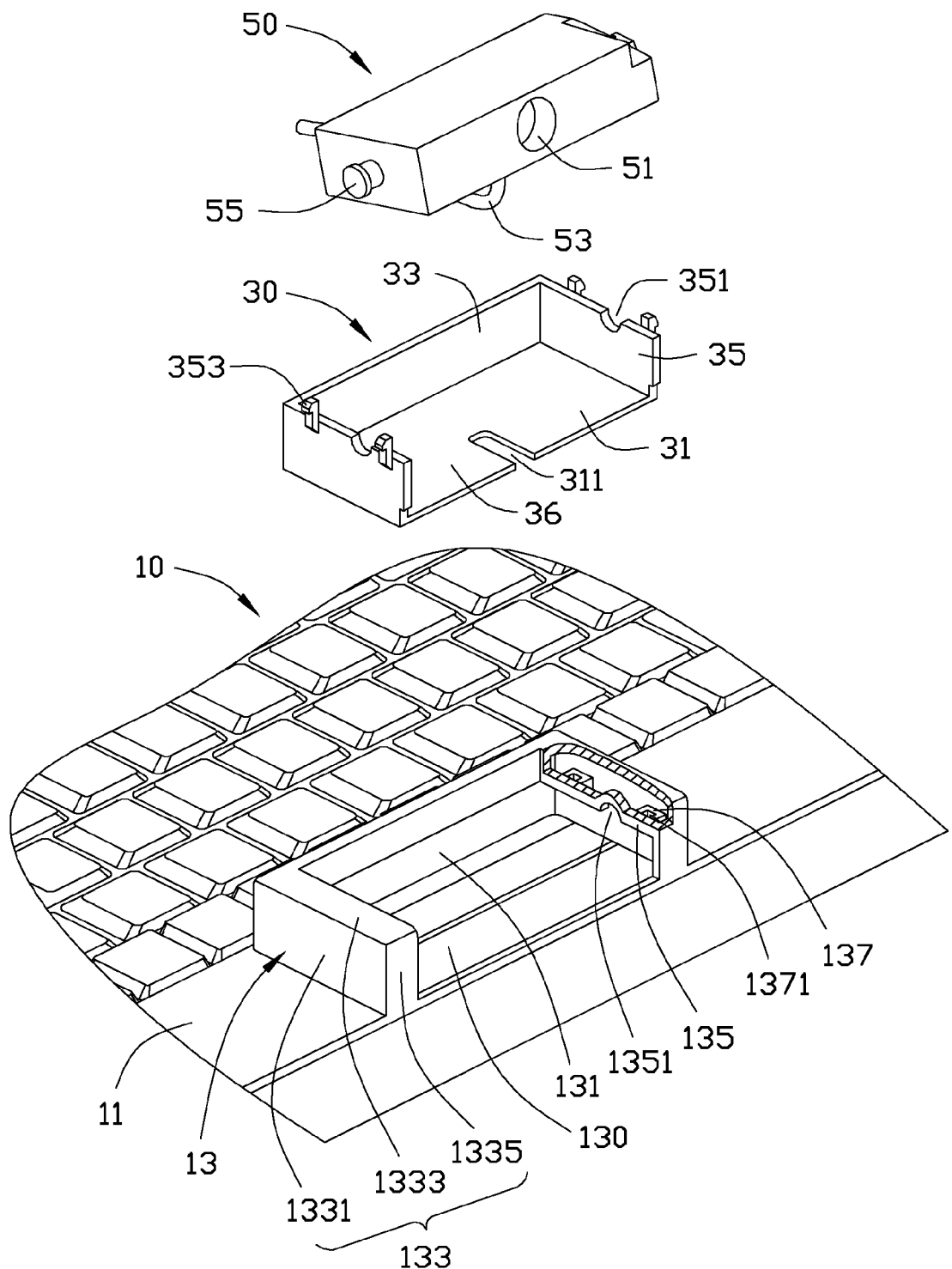
FIG. 1 is an exploded, isometric view of a computer system with a projector in accordance with an embodiment.

Referring to FIG. 1, a computer system in accordance with an embodiment includes a host 10, a bracket 30 configured to be secured to the host 10 and a projector 50 configured to be received in the bracket 30.

The host 10 includes a host enclosure 11 for receiving a plurality of electronic components, such as a motherboard, a disk drive, a memory card, an expansion card etc. A holding portion 13 is located on the host 10. The holding portion 13 includes a rear wall 131, and two parallel sidewalls 133; perpendicular to the rear wall 131. The rear wall 131 and the sidewalls 133 together, define a first holding space 130 configured to receive the bracket 30. Each sidewall 133 includes a top panel 1333; a side panel 1331, perpendicular to the top panel 1333; and a front panel 1335, perpendicular to the top panel 1333 and the side panel 1331. A flange 135 is bent from an edge of the top panel 1333 of each sidewall 133, and connects with the front panel 1335. A distance is defined between the flange 135 and the side panel 1331. Two securing blocks 137 are located on an inner surface of the flange 135 of each sidewall 133. Each securing block 137 defines a securing hole 1371. A flange cutout 1351 is defined in a bottom edge of the flange 135 of each sidewall 133.

Figure 3:
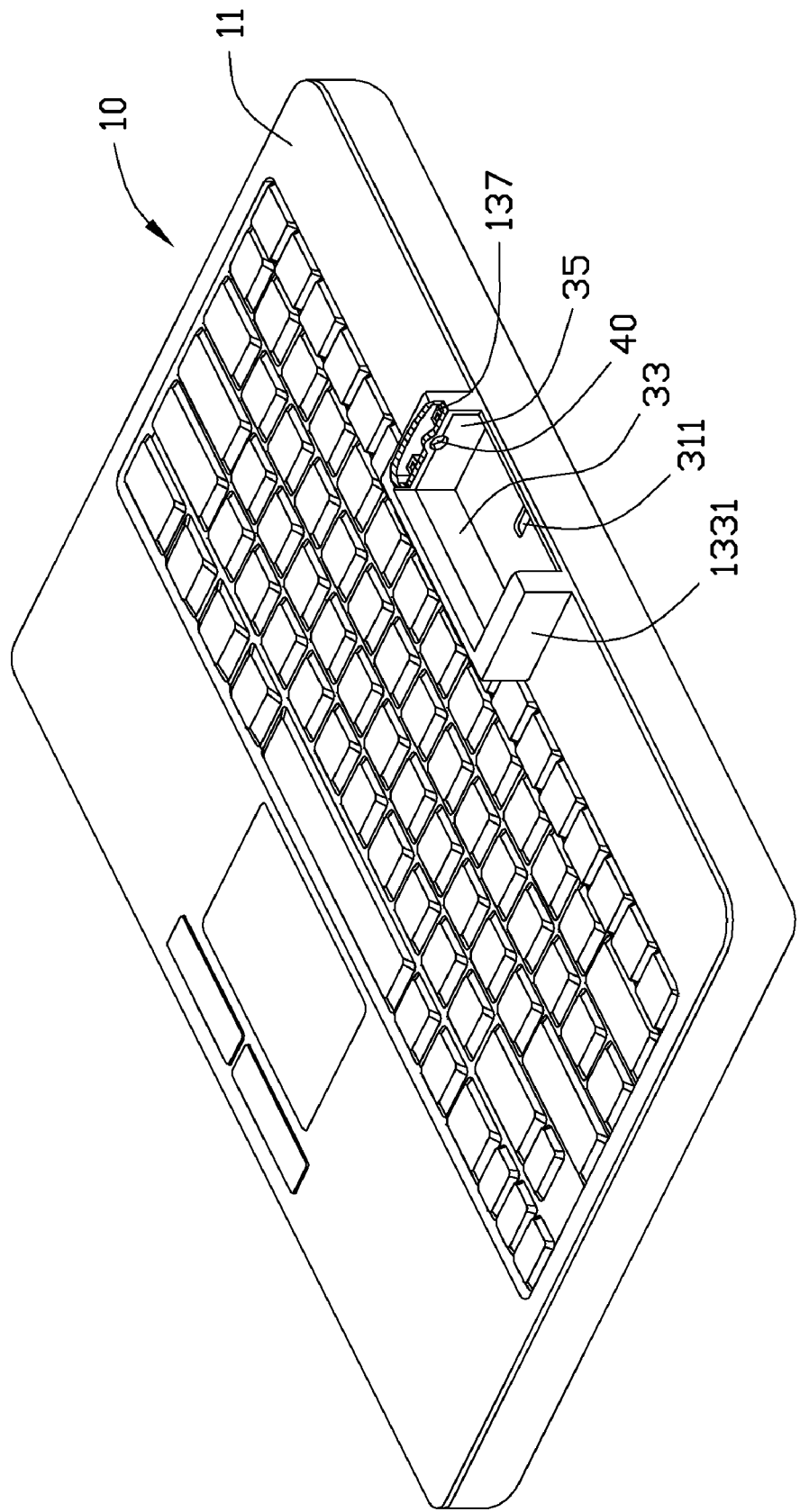
FIG. 3 is similar to FIG. 2, but the projector is not shown

The bracket 30 includes a bottom plate 31, a rear plate 33 perpendicular to the bottom plate 31, and two parallel side plates 35 perpendicular to the bottom plate 31. The bottom plate 31, the rear plate 33 and the side plates 35 together define a second holding space 36 configured to receive the projector 50. Two locking segments 353 are located on an outer surface of each side plate 35 and configured to engage in the securing hole 1371 of the sidewall 133. A bottom plate 31 defines a bottom plate cutout 311 in a front edge thereof. A side plate cutout 351 is defined in a top edge of each side plate 35, and the side plate cutout 351 together with the flange cutout 1351 defines a pivot hole 40 (shown in FIG. 3).

The projector 50 is capable of taking video signals from the host 10 and projecting images corresponding to the video signals on a projection surface 100 (shown in FIG. 4) by using a lens system 51. In the embodiment, the projector 50 has two pivot posts 55 on two opposite sidewalls of the projector 50. The lens system 51 is set in the projector 50 in a front wall of the projector 50. The projector 50 is capable of electrically connecting to the host 10 via a cable 53. The cable 53 extends from the bottom wall of the projector 50 and is configured to be inserted through the bottom plate cutout 311 of the bracket 30.

Figure 2:
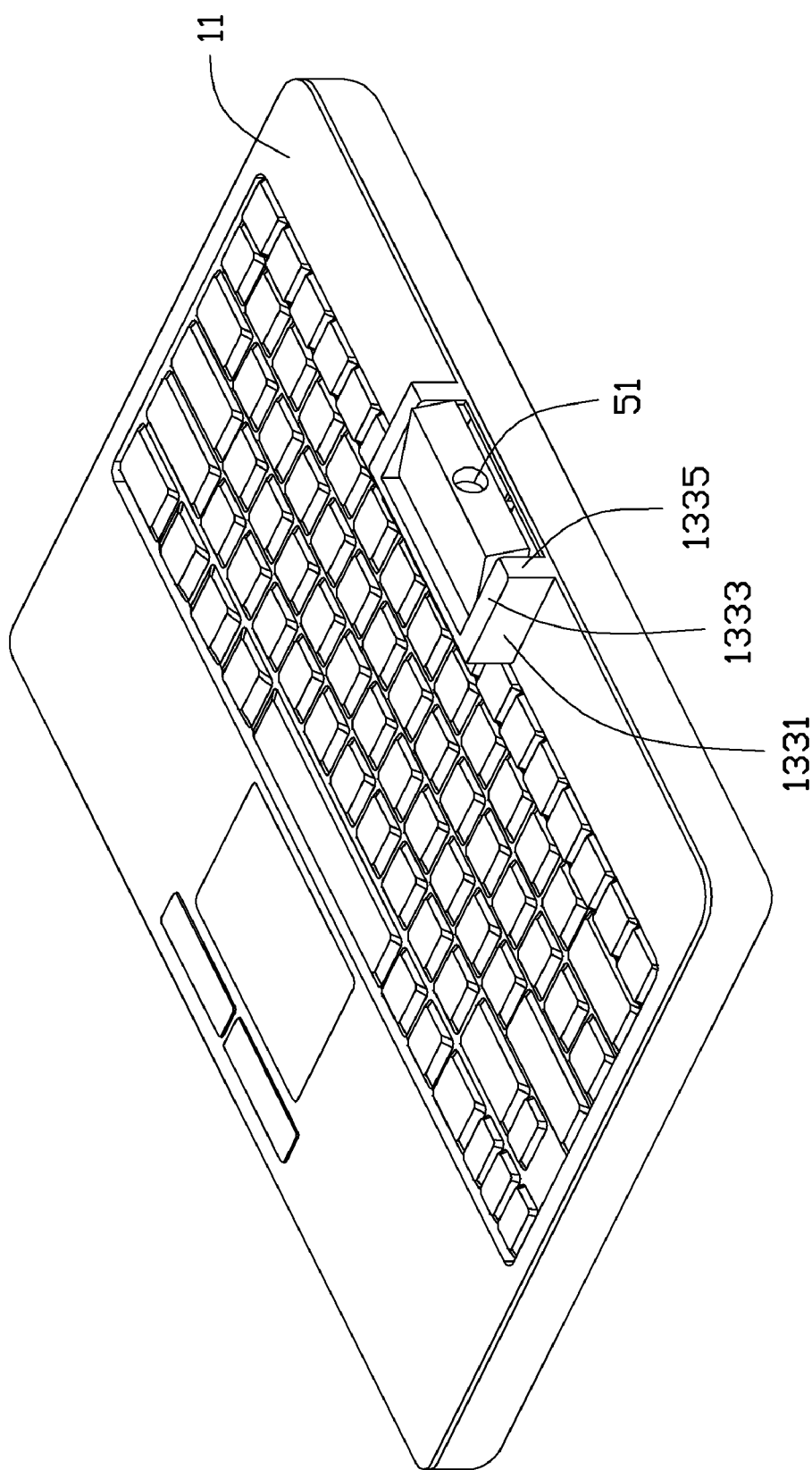
FIG. 2 is an assembled view of the computer system of FIG. 1.

Referring to FIGS. 1-2, in assembly, the projector 50 is placed in the second holding space 36 of the bracket 30. The pivot posts 55 are located in the side plate cutouts 351 of the bracket 30. The cable 53 is inserted through the bottom plate cutout 311 of the bracket 30. The lens system 51 is exposed out of the second holding space 36. The bracket 30 and the projector 50 are together placed inside the host enclosure 11, and the locking segments 353 of the bracket 30 correspond to the securing holes 1371 of the holding portion 13. The bracket 30 is pushed upwards to urge the locking segments 353 to engage in the corresponding securing holes 1371, so as to secure the bracket 30 in the host enclosure 11. The pivot posts 55 are rotatably received in the pivot holes 40 (shown in FIG. 3). The cable 53 is electrically connected to the host 10.

Figure 4:
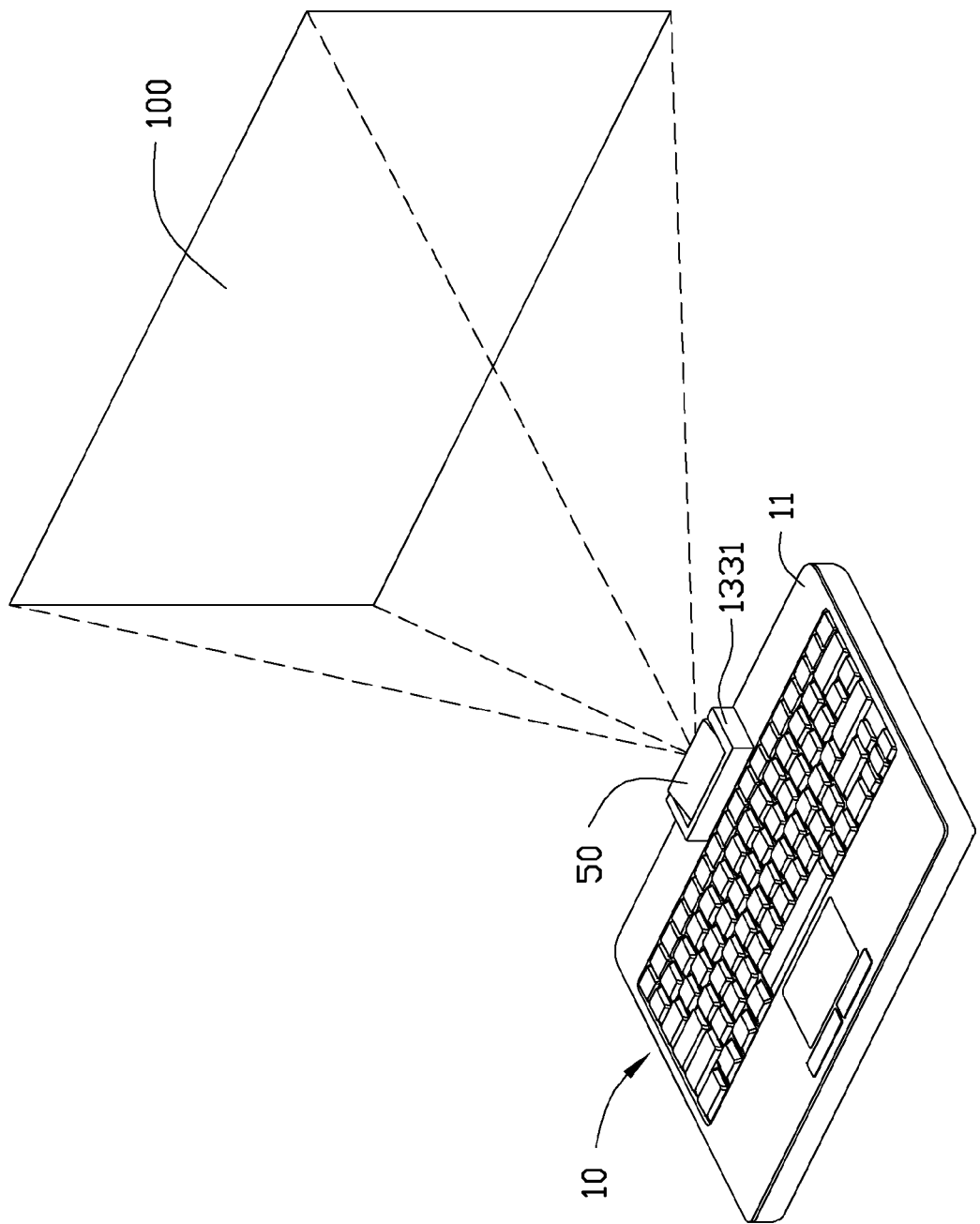
FIG. 4 illustrates the computer system of FIG. 2 in use and the projector projecting images onto a surface.

Referring to FIG. 4, in use, the projector 50 takes video signals from the host 10 and projects images corresponding to the video signals on the projection surface 100 with the lens system 51. The projector 50 can be adjusted to rotate relative to the host 10 by the host 10 or by directly pushing the projector 50, so as to move the projection surface 100. The projection surface 100 may be any adequate reflective surface.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
a host comprising a holding portion, the holding portion defining a first space, and comprising two sidewalls and a flange extending from each of the two sidewalls, each of the flanges defining a first cutout;
a bracket secured to the host, the bracket defining a second space and comprising two side plates, and each of the two side plates defining a second cutout;
a projector electrically connected to the host and rotatable relative to the first space and the second space; and
two pivot posts located on the projector, wherein each of the two pivot posts is rotatably received in the first cutout of each of the flanges and the second cutout of each of the two side plates.

2. The computer system of claim 1, wherein the bracket is secured inside the host, and the projector is received in the first space and the second space.

3. The computer system of claim 1, wherein a plurality of securing blocks is located in the holding portion; a plurality of locking segments is located on the bracket; and the locking segments are engaged with the securing blocks to secure the bracket to the host.

4. The computer system of claim 1, wherein the projector is received between the two sidewalls.

5. The computer system of claim 3, wherein each sidewall comprises a top panel and a side panel perpendicular to the top panel; the flange is located on the top panel; a distance is defined between the flange and the side panel; and the securing blocks are located on the flange between the flange and the side panel.

6. The computer system of claim 1, wherein the two side plates are substantially parallel to each other; the projector is received between the two side plates; and the locking segment is located on the two side plates.

7. The computer system of claim 5, wherein each sidewall further comprises a front panel perpendicular to the top panel and the side panel; and the flange is connected to the front panel.

8. The computer system of claim 1, wherein the first cutout of each sidewall and the corresponding second cutout of each side plate together forms a pivot hole; and the pivot holes rotatably receive the pivot posts of the projector.

9. The computer system of claim 1, wherein the bracket further comprises a bottom plate perpendicular to the side plates; and the bottom plate defines a bottom plate cutout having a cable inserted therethrough; the cable electrically connects the host and the projector.

10. The computer system of claim 9, wherein the bracket further comprises a rear plate perpendicular to the two side plates and the bottom plate.

11. The computer system of claim 1, wherein the holding portion protrudes from a top surface of the enclosure and is integrated with the host.

12. A computer system comprising:
   a holding portion comprising two sidewalls, a flange extending from each of the two sidewalls, and the flange defines a first cutout; a plurality of securing blocks located in the holding portion;
   a bracket comprising two side plates, and each of the two side plates defining a second cutout; a plurality of locking segments located on the bracket, and the locking segments engaging with the securing blocks;
   a projector capable of taking video signals and projecting images corresponding to the video signals on a projection surface; and
   two pivot posts located on the projector, wherein each of the two pivot posts is rotatably received in the first cutout of each the flanges and the second cutout of each of the two side plates.

13. The computer system of claim 12, wherein the holding portion is located on a host; the bracket is placed inside of the host; and the projector is secured between the holding portion and the bracket.

14. The computer system of claim 12, wherein each securing block defines a securing hole; and the securing holes receive the corresponding locking segments.

15. The computer system of claim 12, wherein the projector is received between the two sidewalls.

16. The computer system of claim 12, wherein each sidewall comprises a top panel and a side panel perpendicular to the top panel; the flange is located on the top panel; a distance is defined between the flange and the side panel; and the securing blocks are located on the flange between the flange and the side panel.

17. The computer system of claim 12, wherein the two side plates are substantially parallel to each other; the projector is received between the two side plates; and the locking segment is located on the two side plates.

18. The computer system of claim 16, wherein each sidewall further comprises a front panel perpendicular to the top panel and the side panel; and the flange is connected to the front panel.

19. The computer system of claim 12, wherein the first cutout of each sidewall and the corresponding second cutout of each side plate together forms a pivot hole; and the pivot holes rotatable receive the pivot posts of the projector.

20. The computer system of claim 12, wherein the bracket further comprises a bottom plate perpendicular to the two side plates; the bottom plate defines a bottom plate cutout having a cable inserted therethrough; and the cable electrically connects the host and the projector.

* * * * *